Sept. 20, 1949.  H. G. COMSTOCK  2,482,576
GRIPPING MEANS FOR LANDING FISH
Filed Dec. 16, 1946
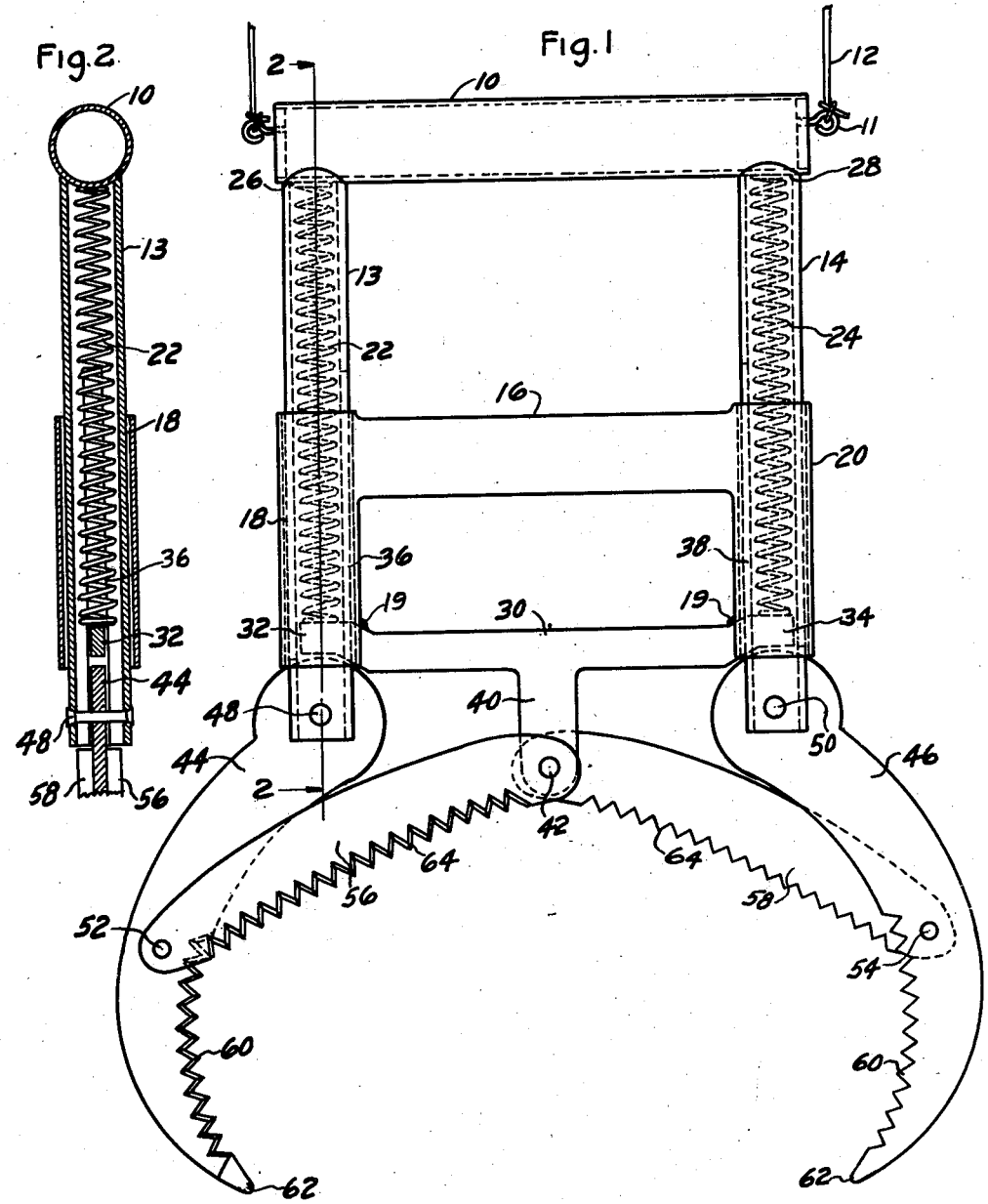
INVENTOR.
HERBERT G. COMSTOCK
BY
ATTORNEY Patented Sept. 20, 1949

2,482,576

UNITED STATES PATENT OFFICE 2,482,576

GRIPPING MEANS FOR LANDING FISH

Herbert G. Comstock, Minneapolis, Minn.

Application December 16, 1946, Serial No. 716,583

1 Claim. (Cl. 43—5)

My invention is related to an improvement in gripping means for landing a fish. While the invention may have general application, it is particularly related to a mechanism useful to anglers for landing a fish when the same has been caught with the use of a hook and line.

Even among skilled anglers, when a fish has been snared, one of the most difficult problems is in successfully landing the catch after it has been reeled in, and is near the surface of the water. Frequently, even with the exercise of great care, the fish escapes during the crucial moments of the landing operation, either by disgorging the hook, or, by breaking either the hook or the line, and occasionally even by jumping out of the boat after it has been successfully freed from the hook. To prevent escape during the steps of the landing operation, most anglers use an auxiliary device such as a gaff hook or a landing net, to aid in successfully bringing the fish out of the water prior to relieving it of the hook. Although landing nets and gaff hooks have been used for considerable periods of time, they are not entirely successful in preventing the escape of the fish, for it often happens that a fish will leap out of the net, or escape from a gaff hook even though badly injured. Furthermore, either landing nets or gaff hooks are rather cumbersome to use and to successfully apply when the fish is fighting vigorously.

My invention provides means for overcoming the difficulty of landing a fish, by the use of a pair of tongs having serrated surfaces which grasp the fish about its back and body portions in such a manner as to paralyze its muscular actions, so that the fish is pacified when it is landed. The advantage of the present invention is that a fish may be quickly and easily subdued by a pair of tongs, which are normally held in an open position and closed with a straight line manual movement by a portion of the thumb and fingers so as to give the greatest amount of leverage to the tongs and to firmly hold the fish during the landing operation.

An object of my invention is to provide a pair of tongs, having co-operating surfaces, which are resiliently held in an open position and made closeable by a manual operation of a portion of the device.

Another object is to provide a pair of tongs that are operated by a pair of link members in which both the tongs and links are provided with serrated surfaces to grip the backbone and muscles of a fish in such a manner as to paralyze its actions.

Another object is to provide an angler's tongs that has a pair of serrated incising members which when applied to the body of a fish grip it in such a manner as to prevent its escape from the serrated incising surfaces.

A further object is to provide an angler's tongs formed of a pair of pivotally mounted curved serrated tines and a pair of serrated links arranged in a manner for grasping and holding the body of a fish by a manually movable member held by an operator between the second joint of the thumb and the fingers of one hand.

Other and further objects will be apparent from the following description and claim, and from the appended drawing in which:

Fig. 1 is a plan view of a pair of tongs; and

Fig. 2 is a sectional elevation taken of the lines 2—2 of Fig. 1.

Referring now to the drawing, the structure will be explained in detail.

Reference numeral 10 indicates a handle into which is fastened a pair of hooks 11 for attachment to the opposite ends of a lanyard 12. A pair of arms 13 and 14 are rigidly attached to handle 10. Shown beneath handle 10 is a second handle 16, to the opposite extremities of which are attached a pair of tubular members 18 and 20 that surround arms 13 and 14. A pair of compression springs 22 and 24 are located within arms 13 and 14, one end of each of which is anchored to handle 10 as indicated by reference numerals 26 and 28. A T-shaped member 30 is welded between tubular members 18 and 20 as indicated by reference numeral 19 and has its horizontal extremities 32 and 34 extending through slots 36 and 38 in arms 13 and 14, in abutting relationship with the lower ends of springs 22 and 24. Extending from the center portion of member 30 is a depending portion 40 which supports a pivot 42.

A pair of tines 44 and 46 are positioned within slots 36 and 38 of arms 13 and 14 and are connected to arms 13 and 14 by pivots 48 and 50. Tines 44 and 46 each carry adjacent their mid-portions a pivot 52 and 54. A pair of links 56 and 58 are each connected at one end to portion 40 of T-shaped member 30 by means of pivot 42, and at their outer extremities they are connected to tines 44 and 46 by means of pivots 52 and 54. The pivots 52, 54 are located at least one half the distance between the pivots 48, 50 and the free outer ends of the tines. Tines 44 and 46 are provided with a series of serrations 60 which are obliquely cut from the outer surface of each of the tines and extend inwardly toward their inner surfaces in such a manner as to form a series of sharp points on their inner co-operating surfaces that will cut into the surface of the body of a fish if it moves outwardly in either direction with relation to the tines. Tines 44 and 46 are also provided on their outer extremities with angularly disposed sharp points 62, which will permit the tines to overlap. Links 56 and 58 are in a similar manner provided with obliquely cut serrations 64 which are disposed on the incising surfaces of the links in the same manner that serrations 60 are disposed on tines 44 and 46.

In operation, the device which forms the present invention is particularly useful to an angler in completing the landing operation when a fish has been snared with a hook and line, and has been reeled into within reach of the angler, as for example, in the water adjacent the boat from which the angler is fishing. Under these conditions, as the catch is brought up close to the surface of the water it is generally fighting vigorously and is very apt to gain its liberty, either through breaking the hook or the line, or by disgorging the hook. With the fishing pole held in one hand and the fish reeled in to a point where it is within arm's reach of the angler, the tongs are held in the free hand, with handle 10 between the palm of the hand and the second joint of the thumb, and with the fingers inclosing the secondary handle 16. The device is moved in the direction of the fish and, if possible, in such a manner that the backbone of the fish is between tines 44, 46 and links 56, 58 with its backbone adjacent pivot 42. Then by squeezing handles 10 and 16, T-shaped piece 30 moving against the resilience of springs 22 and 24 causes an upward movement of portion 40, which through the pivotal connections at 42, 52, and 54 causes links 56 and 58 to move the outer extremities of tines 44 and 46 in overlapping relationship to each other to embrace the fish within at least a portion of the tines and between the serrated surfaces of links 56 and 58. The enormous amount of leverage provided between the base of the thumb and the fingers on the handle members 10 and 16 is such that a very strong incising action is obtained between links 56 and 58 which when applied to the backbone and sides of a fish, and particularly when aided by the serrated surfaces 60 and 62 on the tines and links, is such that the fish will be paralyzed and subdued to docility. Under these conditions and with pressure still being applied between handles 10 and 16 the fish can be easily brought into the boat and held until the hook can be removed from its mouth and other means applied for securing the fish against escape. Because of the oblique disposition of the serrations on the tines and the links, they will tend to cut into the body of the fish if it attempts to move either backward or forward to escape from the tongs, and thus it remains practically motionless.

An important feature of the invention is the fact that springs 22 and 24 exert a force against T-shaped member 30 and links 56 and 58 to hold tines 44 and 46 in a normally open position so that no effort need be made by the operator to open the tongs. This operation also causes the extensions 32, 34 of member 30 to engage the upper ends of the tines which act as stops to limit the movement of the members 16 and 30 outwardly from handle 10. The arrangement between handles 10 and 16 is therefore such that the angler need only grasp at the fish with the device, and by a normal muscular reaction, quickly grasp the fish between the tines where it will be held until handle 16 is released.

A further advantage resides in the incising action of the links 56 and 58. If the device is manipulated so as to bring the backbone of the fish in close proximity to the pivot 42, when the handle 16 is moved upwardly, the links tend to overlap, which causes a powerful incising action to take place immediately below the pivot. The cooperative effect of the links and their serrations completely paralyzes the muscular actions of the fish so that the fish remains virtually motionless while it is being landed and the hook removed from its mouth.

It will be apparent to those skilled in the art that numerous changes or substitutions may be made in my device and therefore I do not wish to be restricted to the single illustration but rather to the extent of the appended claim.

I claim:

An angler's tongs which comprises, a first handle member, a pair of tubular arms extending from said first handle member, a pair of springs located within the tubular portions of said arms, a second handle member tubularly supported about said arms, a T-shaped member carried by said second handle member and having its horizontal extremities extending through apertures in said arms into abutting relationship with said springs, a pair of incising tongs pivotally mounted adjacent the outer extremities of said arms and held in spaced relation to each other by said springs, and a pair of links pivotally mounted at one end to said T-shaped member and at their opposite ends to said tongs for moving said tongs in overlapping relationship with each other the adjacent surfaces of said links having cooperating serrated surfaces and forming an incising surface extending from said T-shaped member which is operative to grasp the body of a fish and paralyze its muscular actions when the second handle is moved in the direction of the first handle.

HERBERT G. COMSTOCK.

REFERENCES CITED

The following references are of record in the file of this patent:

UNITED STATES PATENTS

| Number | Name | Date |
| --- | --- | --- |
| 332,914 | Lewis | Dec. 22, 1885 |
| 405,001 | Barton | June 11, 1889 |
| 1,018,065 | Marble | Feb. 20, 1912 |
| 2,241,308 | Koivu | May 6, 1941 |

OTHER REFERENCES

Shakespeare Co., Catalog No. 38A, copyright 1937, page 90, item No. 8920, "Shakespeare's Falcon Gaff." Published by Shakespeare Co., Kalamazoo, Michigan. (A copy of this catalog is on file in Div. 2.)